United States Patent
Moon et al.

(10) Patent No.: US 7,999,773 B2
(45) Date of Patent: Aug. 16, 2011

(54) DISPLAY APPARATUS AND MANUFACTURING METHOD THEREOF

(75) Inventors: Jong-hak Moon, Hwaseong-si (KR); Kyoung-choul Jang, Suwon-si (KR); Byung-jo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 11/656,541

(22) Filed: Jan. 23, 2007

(65) Prior Publication Data
US 2007/0171166 A1    Jul. 26, 2007

(30) Foreign Application Priority Data
Jan. 23, 2006  (KR) .................. 10-2006-0006999

(51) Int. Cl.
G09G 3/34   (2006.01)
(52) U.S. Cl. ............... 345/84; 345/85; 345/86; 345/108
(58) Field of Classification Search .................. 359/223, 359/848, 849; 361/681, 752, 800, 816, 679.09, 361/679.26; 362/31; 345/84–87, 108, 173, 345/214, 905, 156, 30; 349/150; 348/14.01, 348/341, 744, 339.03
See application file for complete search history.

(56) References Cited

U.S. PATENT DOCUMENTS

| | | | | |
|---|---|---|---|---|
| 4,898,540 A | * | 2/1990 | Saito ............................ | 439/153 |
| 5,583,529 A | * | 12/1996 | Satou ............................. | 345/87 |
| 5,612,732 A | * | 3/1997 | Yuyama et al. ............. | 348/14.01 |
| 5,668,695 A | * | 9/1997 | Nakamura et al. ........ | 361/679.26 |
| 5,768,095 A | * | 6/1998 | Nakamura et al. ........ | 361/679.09 |
| 5,769,551 A | * | 6/1998 | Tsai et al. ...................... | 400/489 |
| 5,825,408 A | * | 10/1998 | Yuyama et al. ............. | 348/14.01 |
| 6,220,741 B1 | * | 4/2001 | Kawachi et al. ............. | 362/561 |
| 6,275,683 B1 | * | 8/2001 | Smith ........................ | 455/575.1 |
| 6,348,907 B1 | * | 2/2002 | Wood .............................. | 345/84 |
| 6,525,750 B1 | * | 2/2003 | Knox .............................. | 345/30 |
| 6,814,445 B2 | | 11/2004 | Kalyandurg et al. | |
| 6,992,718 B1 | * | 1/2006 | Takahara .................. | 348/333.09 |

(Continued)

FOREIGN PATENT DOCUMENTS
JP    2003-215700 A    7/2003

(Continued)

OTHER PUBLICATIONS

Communication dated Jul. 1, 2011, issued by the Korean Intellectual Property Office in counterpart Korean Patent Application No. 10-2006-0006999.

*Primary Examiner* — Prabodh M Dharia
(74) *Attorney, Agent, or Firm* — Sughrue Mion, PLLC

(57) ABSTRACT

A display apparatus and a manufacturing method thereof which allow a component to be replaced and repaired simply, rapidly, and stably are provided. The display apparatus comprises a main body which accommodates a light source part, and comprises a display element which displays an image using light emitted from the light source part; an element panel which accommodates the display element; a front cover which is coupled to the main body and provided with a panel mounting part to which the element panel is detachably coupled; and an element driving board which is coupled to the front cover, is opposite to the main body, interposes the front cover between the element driving board and the main body, and is electrically connected with the display element.

16 Claims, 7 Drawing Sheets

U.S. PATENT DOCUMENTS

| | | | |
|---|---|---|---|
| 7,091,665 B2 * | 8/2006 | Nomoto et al. | 313/583 |
| 7,250,725 B2 * | 7/2007 | Nomoto et al. | 313/583 |
| 2002/0080566 A1 * | 6/2002 | Kim | 361/681 |
| 2002/0104769 A1 * | 8/2002 | Kim et al. | 206/320 |
| 2003/0001525 A1 * | 1/2003 | Lee | 315/364 |
| 2004/0150798 A1 | 8/2004 | Tsao et al. | |
| 2004/0174679 A1 | 9/2004 | Hung et al. | |
| 2005/0105036 A1 * | 5/2005 | Murakami | 349/150 |
| 2005/0162618 A1 * | 7/2005 | Morita et al. | 353/57 |
| 2005/0253970 A1 * | 11/2005 | Jang | 348/744 |
| 2005/0254014 A1 | 11/2005 | Kim | |
| 2006/0017887 A1 * | 1/2006 | Jacobson et al. | 353/30 |
| 2006/0145615 A1 * | 7/2006 | Nomoto et al. | 313/583 |
| 2006/0150452 A1 * | 7/2006 | Chen | 40/471 |
| 2006/0168862 A1 * | 8/2006 | Kim et al. | 40/725 |
| 2006/0227304 A1 * | 10/2006 | Kang et al. | 353/119 |
| 2007/0206390 A1 * | 9/2007 | Brukilacchio et al. | 362/555 |

FOREIGN PATENT DOCUMENTS

| | | | |
|---|---|---|---|
| JP | 2005-124789 | * | 5/2005 |
| JP | 2005-128369 A | | 5/2005 |
| KR | 10-0534139 B1 | | 12/2005 |

* cited by examiner

DISPLAY APPARATUS AND MANUFACTURING METHOD THEREOF

CROSS-REFERENCE TO RELATED APPLICATIONS

This application claims priority from Korean Patent Application No. 2006-0006999, filed on Jan. 23, 2006 in the Korean Intellectual Property Office, the disclosure of which is incorporated herein by reference.

BACKGROUND OF THE INVENTION

1. Field of the Invention

The present invention relates to a display apparatus and a manufacturing method thereof, and more particularly, to a display apparatus and a manufacturing method thereof which allow a component to be replaced and repaired efficiently.

2. Description of the Related Art

Generally, a display apparatus includes an optical part which has a display element, and a light source which supplies light to the optical part. Such a display apparatus may comprise a television (TV), an optical engine apparatus, a personal digital assistant (PDA), or an electronic frame.

A display apparatus may be used in a cathode ray tube (CRT), a liquid crystal display (LCD), a digital light processing (DLP) display, and a plasma panel display (PDP).

An optical engine apparatus includes an element panel part which is provided with a display element, such as a digital micromirror device (DMD), and a light source which supplies light to the element panel part. The optical engine apparatus projects an image formed by the display element to be magnified on a screen.

The optical engine apparatus includes various components. The element panel part includes the display element which forms an image by means of light emitted from the light source, an element driving board which drives the display element, and a front cover which accommodates the display element and the element driving board. The display element and the element driving board are coupled to the front cover together, and are coupled to a main body of an engine.

However, in the related art optical engine apparatus, the components are assembled as one body. Thus, when components such as an element driving board are replaced or repaired, the front cover must be disassembled, and the element driving board and the display element must be disassembled from the front cover. Also, after replacing or repairing the components, the front cover must be reassembled. At this time, a change in the position of the display element may change an image position and a focus of the display element, which causes a decrease in quality. Also, the time required for replacement or repair of the components increases.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus and a manufacturing method thereof which allow a component to be replaced and repaired simply, rapidly, and stably.

The present invention provides a display apparatus which comprises a main body which accommodates a light source part, comprising a display element which displays an image using light emitted from the light source part; an element panel which accommodates the display element; a front cover which is coupled to the main body and is provided with a panel mounting part to which the element panel is detachably coupled; and an element driving board which is coupled to the front cover, is opposite to the main body, interposes the front cover between the element driving board and the main body, and is electrically connected with the display element.

According to an exemplary embodiment of the present invention, the display apparatus further comprises an interposer which supports the display element, wherein the element panel comprises an element accommodating part which accommodates the interposer, and the element accommodating part is provided with a pushing protrusion which pushes the interposer.

According to an exemplary embodiment of the present invention, the display apparatus further comprises a rear shield which is coupled to the element driving board to shield the element driving board.

According to an exemplary embodiment of the present invention, the panel mounting part and the element panel are formed with a panel coupling hole, and the front cover and the element panel are coupled together by a screw inserted through the panel coupling hole.

According to an exemplary embodiment of the present invention, the display element comprises a digital micromirror device (DMD).

The present invention provides a method of manufacturing a display apparatus comprising a main body which accommodates a light source part, comprising coupling a display element to an element panel; detachably coupling the element panel to a panel mounting part on a front cover; and coupling the front cover to the main body when the front cover is coupled with the element panel.

According to an exemplary embodiment of the present invention, the method of manufacturing the display apparatus further comprises accommodating the display element and an interposer which supports the display element to an element accommodating part which is formed to the element panel; and pushing the interposer by a pushing protrusion which is formed to the element accommodating part.

According to an exemplary embodiment of the present invention, the method of manufacturing the display apparatus further comprises coupling to the front cover an element driving board which is electrically connected with the display element, is opposite to the main body, and interposes the front cover between the element driving board and the main body.

According to an exemplary embodiment of the present invention, the method of manufacturing the display apparatus further comprises coupling a rear shield which shields the element driving board to the element driving board.

BRIEF DESCRIPTION OF THE DRAWINGS

The above and other aspects of the prevent invention will become apparent and more readily appreciated from the following description of exemplary embodiments, taken in conjunction with the accompany drawings, in which.

DETAILED DESCRIPTION OF EXEMPLARY EMBODIMENTS OF THE INVENTION

Figure 1:
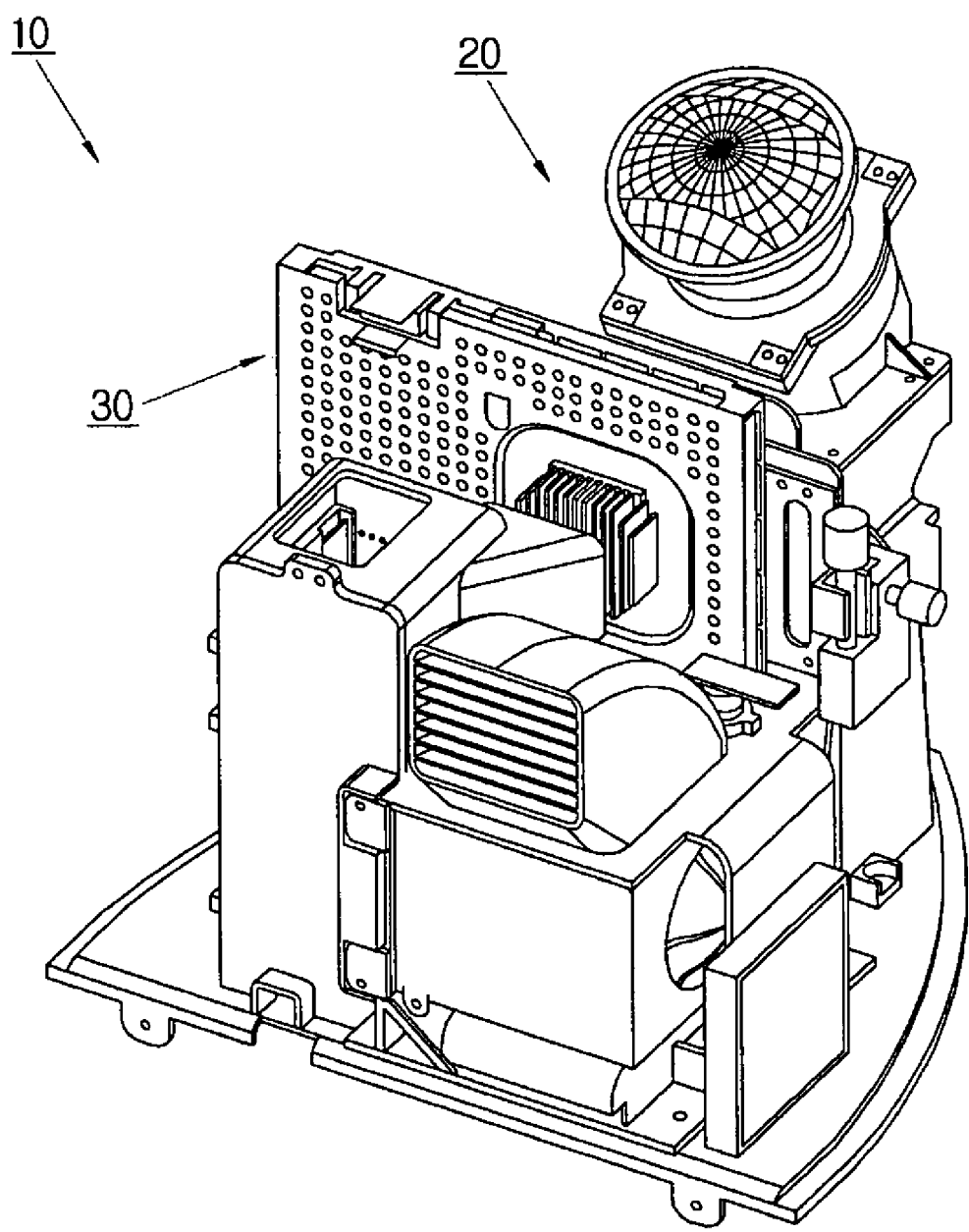
FIG. 1 is a perspective view illustrating an optical engine apparatus according to an exemplary embodiment of the present invention.
Figure 2:
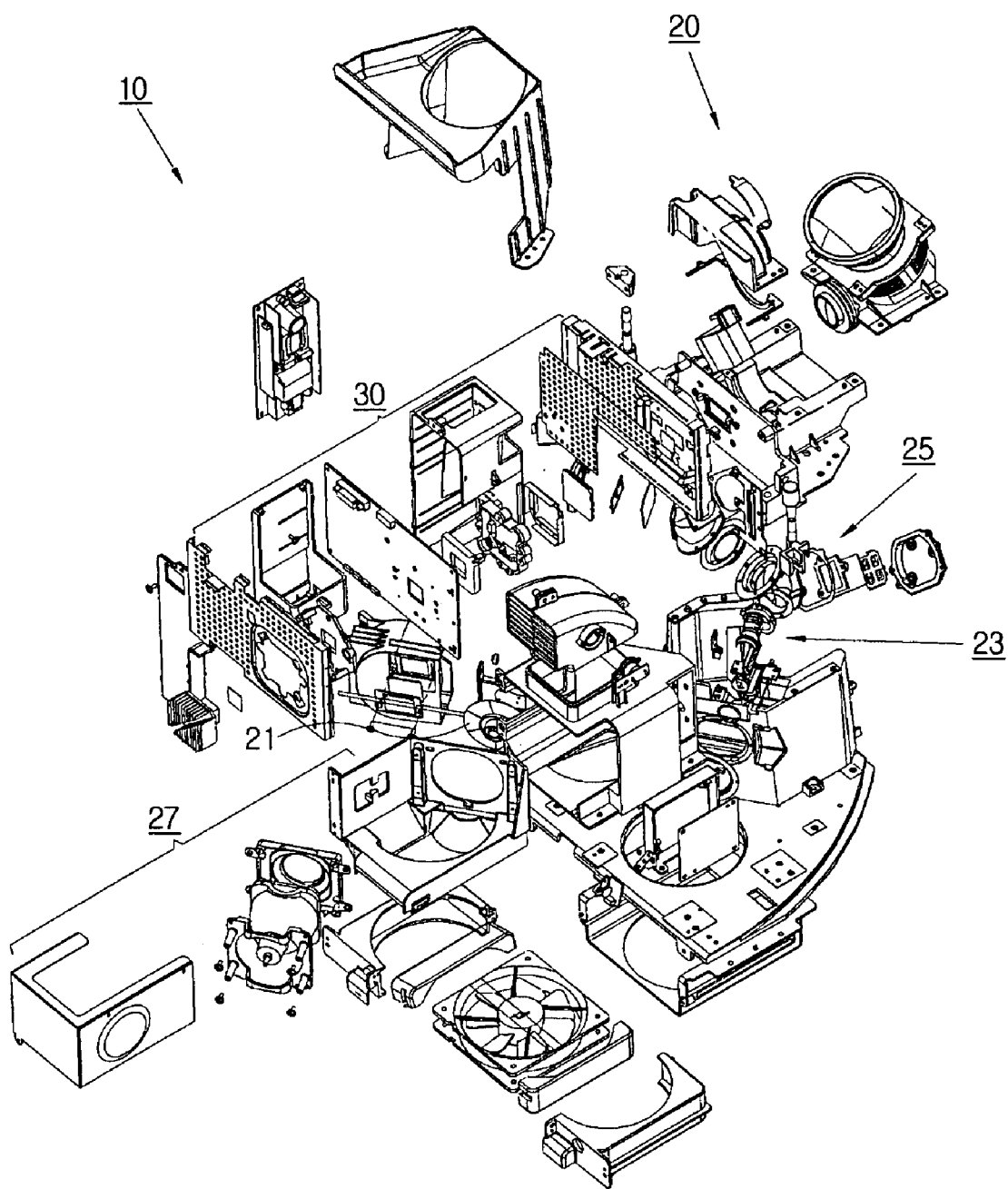
FIG. 2 is an exploded perspective view illustrating the optical engine in FIG. 1.

Reference will now be made in detail to exemplary embodiments of the present invention, examples of which are illustrated in the accompanying drawings, wherein like reference numerals refer to like elements throughout.

As shown in FIGS. 1 to 4, an optical engine apparatus 10 according to an exemplary embodiment of the present invention includes a main body 20 and an element panel part 30, which is provided with a display element 40 which forms an image with light emitted from a light source 27. Also, the optical engine apparatus 10 includes an element driving board 70 which is coupled to a front cover 60, and faces the main body 20, so that the front cover 60 is interposed between the element driving board 70 and the main body 20. The front cover 60 is electrically connected with the display element 40 and a rear shield 80, which is coupled to the element driving board 70 to shield the element driving board 70. The optical engine apparatus 10 is used in a DLP display apparatus. Alternatively, the optical engine apparatus 10 may be used in another type of display apparatus.

The main body 20 includes a color wheel assembly 21, which has a color wheel which divides light emitted from the light source 27 into three R, G, and B color beams; a light tunnel assembly 23 which has a light tunnel which transforms light transmitted through the color wheel assembly 21 into uniform light with the same shape as a plane of the element panel part 30; and a light path changing assembly 25 which has a light path changing part which changes the path of light through the light tunnel assembly 23 toward the element panel part 30.

The light source 27 may include a light emitting diode (LED). A plurality of LEDs may be provided to emit red light, green light, and blue light, and may be coupled to light source boards which support and drive the respective LEDs. A heat radiating plate (not shown) may be provided in a side of the light source boards to radiate heat from the LEDs. Alternatively, the light source 27 may include a discharge lamp, such as a mercury lamp, a metal lamp, or a xenon lamp.

The element panel part 30 includes an element panel 50 which accommodates the display element 40, and the front cover 60 which is formed with a panel mounting part 61 to be coupled to the main body 20, and to detachably couple the element panel 50 to the main body 20.

The display element 40 uses light emitted from the light source 27 to generate an image signal. The display element 40 includes a DMD. The display element 40 uses light emitted onto a semiconductor chip integrated with hundreds of thousands of minute driving mirrors to generate an image signal. The driving mirrors are digitally controlled to be switched on and off over five hundred thousand times per second. Since the optical engine apparatus 10 projects light by controlling time to reflect light by the minute driving mirrors, the optical engine apparatus 10 can use light with a high efficiency. The display element 40 is accommodated to an element accommodating part 51 of the element panel 50 which is supported by an interposer 41. Since an image position and a focus of the display element 40 change based on an angle at which the display element 40 is coupled to the element panel 50 or the front cover 60, it is advantageous for the angle not be changed when a component such as the element driving board 70 is replaced or repaired. Accordingly, since the display element 40 is accommodated to the element accommodating part 51 of the element panel 50 which is supported by the interposer 41, the element driving board 70 can be simply and rapidly replaced, without disassembling the element panel 50 from the front cover 60.

The interposer 41 is accommodated to the element accommodating part 51 to support the display element 40. The interposer 41 may include an electrical connecting member, such as a predetermined pin, which electrically connects the display element 40 with the element driving board 70. The interposer 41 is coupled by a pushing protrusion 53, which is formed to the element accommodating part 51 in order to prevent being separated from the element accommodating part 51. Accordingly, when the element driving board 70 is replaced or repaired, the position of the display element 40 is not changed. Thus, the replacing or repairing process is simplified, and it is unnecessary to adjust the display element 40, thereby reducing a work time for the replacing or repairing process.

The element panel 50 includes the element accommodating part 51, which is recessed from a surface of the element panel 50 to accommodate the display element 40 and the interposer 41. The element panel 50 is coupled to the panel mounting part 61 of the front cover 60 by a coupling means, such as a screw inserted through a panel coupling hole 63, which is formed to the element panel 50. The element panel 50 is coupled by a coupling means that is different from the coupling means which couples the element driving board 70 to the front cover 60. Thus, when the element driving board 70 is replaced or repaired, the element panel 50 can be prevented from being separated from the front cover 60. Accordingly, an image position and a focus of the display element 40 can be prevented from being changed, and a replacing process and a repairing process can be simple and rapid.

The element accommodating part 51 is recessed from a surface of the element panel 50 toward the main body 20, in order to accommodate the display element 40 and the interposer 41. The element accommodating part 51 includes the pushing protrusion 53 which protrudes from a surface toward a side of the interposer 41, in order to push the side of the interposer 41. The interposer 41 may include a protrusion accommodating part which accommodates the pushing protrusion 53, so that the interposer 41 is coupled in a coupled position. Thus, the element accommodating part 51 can stably accommodate the display element 40 and the interposer 41 to fix the interposer 41.

At least one pushing protrusion 53 protrudes toward a side of the interposer 41, and pushes the interposer 41 to stably couple the interposer 41 in the coupled position. Alternatively, the pushing protrusion 53 may include an elastic protrusion (not shown) formed out of an elastic material. Also, alternatively, the pushing protrusion 53 may protrude from a side surface of the interposer 41 toward the element accommodating part 51. Thus, the interposer 41 can be stably coupled to the element accommodating part 51 in the coupled position, and the display element 40 can be supported, thereby preventing the display element 40 from being deformed. Accordingly, an image position formed by the display element 40 and a focus of the display element 40 can be maintained.

A first side of the front cover 60 is coupled to the main body 20, a second side of the front cover 60 is formed with the panel mounting part 61 detachably mounted to the element panel 50, and the front cover 60 is coupled with the element driving board 70. The panel mounting part 61 is formed with the panel coupling hole 63 coupled with the element panel 50. The front cover 60 is not disassembled from the element panel 50 when the element driving board 70 is disassembled. Accordingly, the element driving board 70 can be simply and rapidly replaced, and an image position and a focus of the display element 40 is not changed when disassembling and reassembling the front cover 60.

The panel mounting part 61 is recessed from a surface toward the main body 20 to detachably mount the element panel 50, and includes the panel coupling hole 63, through which a screw couples the element panel 50 with the front cover 60. Alternatively, the element panel 50 and the front cover 60 may be coupled together by a hook and a hook engaging part, a protrusion and a groove, or other coupling means.

The element driving board 70 is coupled to the front cover 60, is opposite to the main body 20, interposes the front cover 60 between the element driving board 70 and the main body 20, and is electrically connected with the display element 40. Thus, the element driving board 70 can be replaced or repaired without disassembling the display element 40 from the front cover 60.

The rear shield 80 is coupled to a rear side of the element driving board 70 to protect the element driving board 70. The rear shield 80 is formed of a material comprising metal, so that electromagnetic waves generated from the element driving board 70 are prevented from being emitted to the outside. The rear shield 80 includes an opening which accommodates a heat sink 81, and is formed with a plurality of through holes to have a predetermined size to efficiently radiate heat.

The heat sink 81 radiates heat generated from the display element 40 and the element driving board 70.

Hereinafter, an assembling method for the optical engine apparatus 10 will be described by referring to FIG. 3 and FIGS. 5A to 5C.

Figure 3:
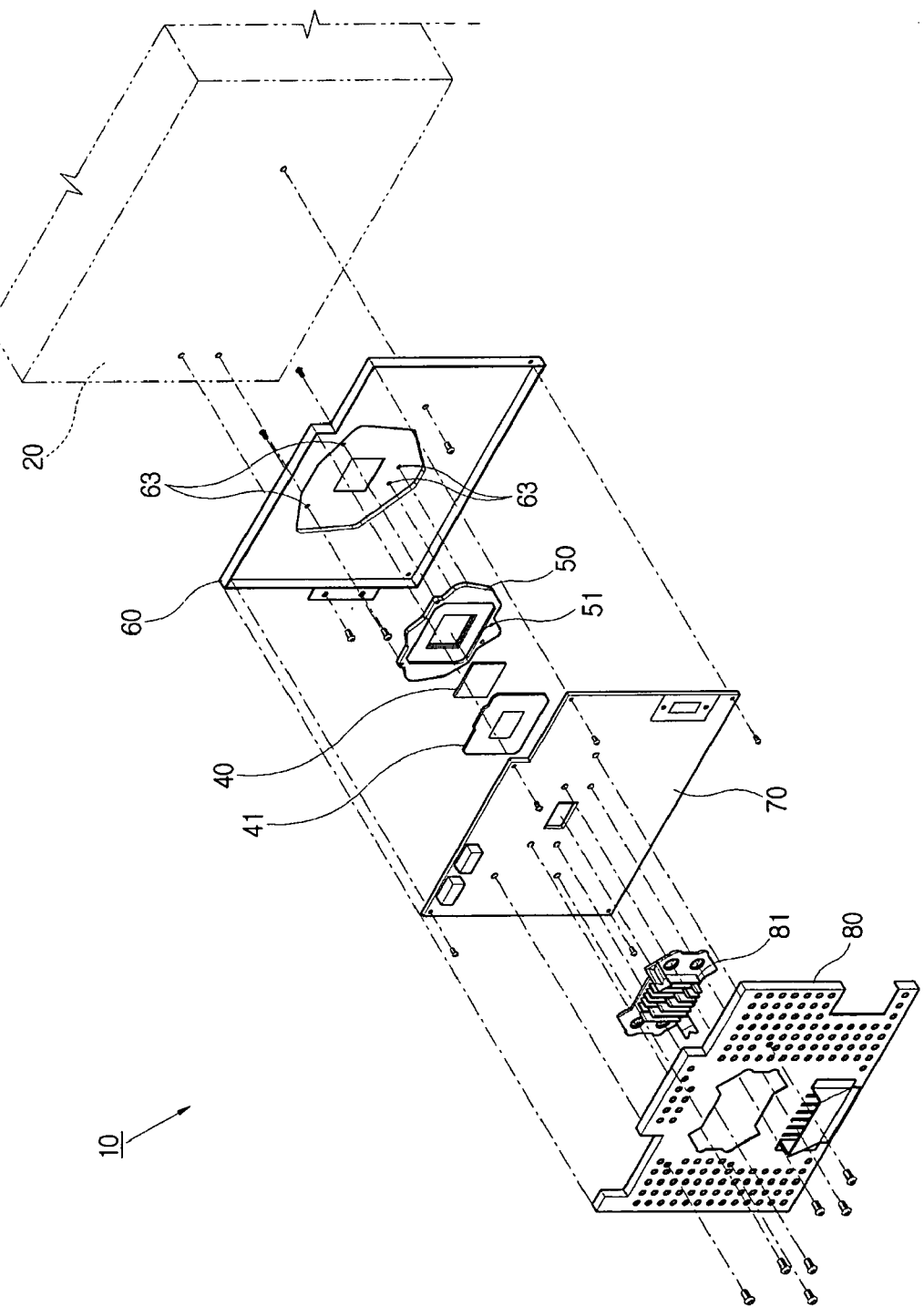
FIG. 3 is an exploded perspective view illustrating an element panel part in FIG. 1.
Figure 4:
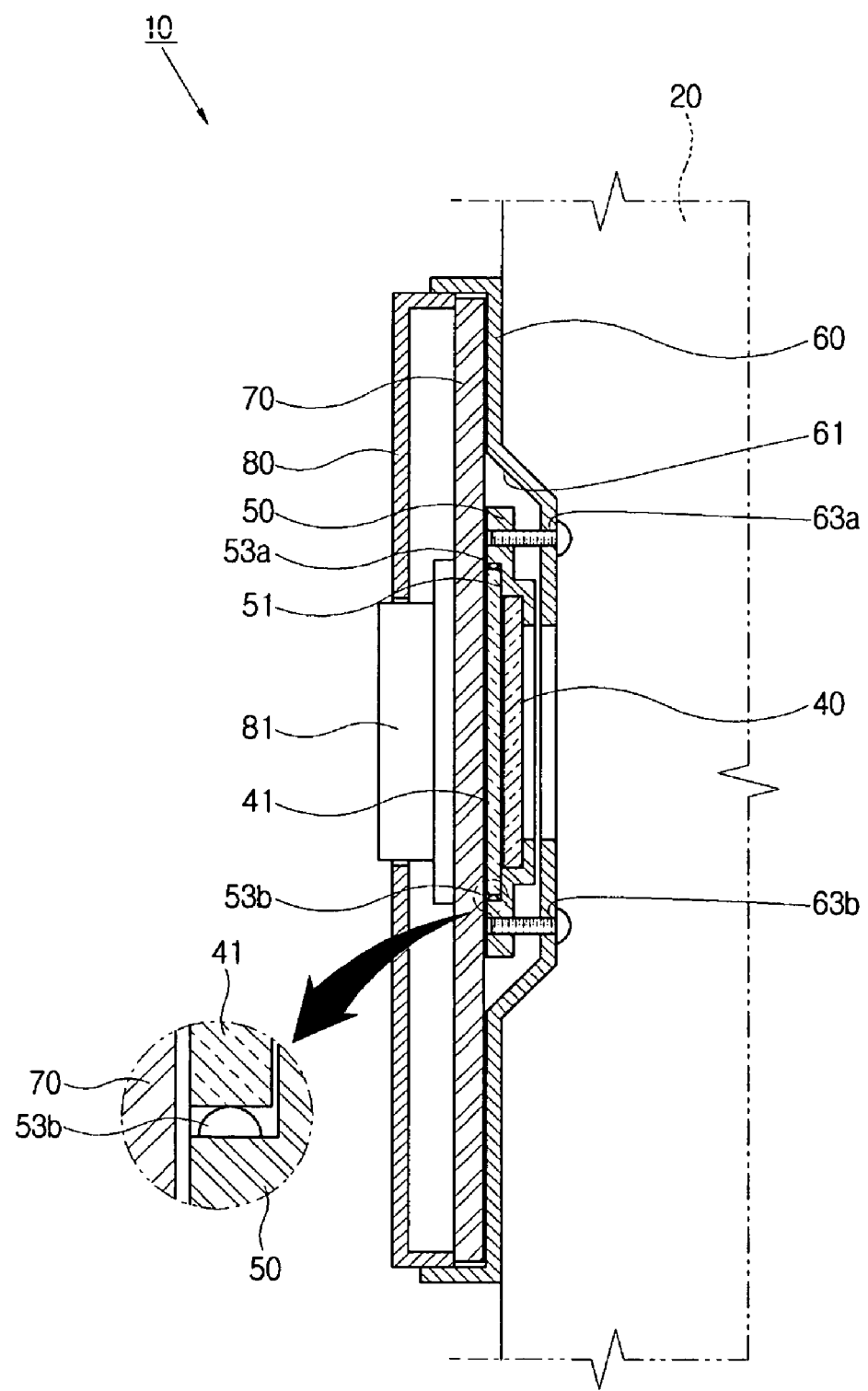
FIG. 4 is a sectional view illustrating the element panel part in FIG. 3.

As shown in FIG. 3, the color wheel assembly 21, the light tunnel assembly 23, and the light path changing assembly 25 are assembled together to form the main body 20 of the optical engine apparatus 10.

The interposer 41 of the display element 40 is accommodated to the element accommodating part 51 of the element panel 50, and the interposer 41 is pushed by the pushing protrusion 53 of the element accommodating part 51 to be fixed at the coupled position. The element panel 50 is accommodated to the panel mounting part 61 of the front cover 60 to be coupled to the front cover 60 by the panel coupling hole 63 and the screw. The front cover 60 is coupled to the main body 20 by the screw. Then the element driving board 70 is coupled to the front cover 60. Thus, the display element 40 is electrically connected with the element driving board 70. Then the rear shield 80 is coupled to a rear side of the element driving board 70. The heat sink 81 is coupled to the element driving board 70.

Hereinafter, a component replacing method for the optical engine apparatus 10 will be described by referring to FIGS. 5A to 5C.

Figure 5A:
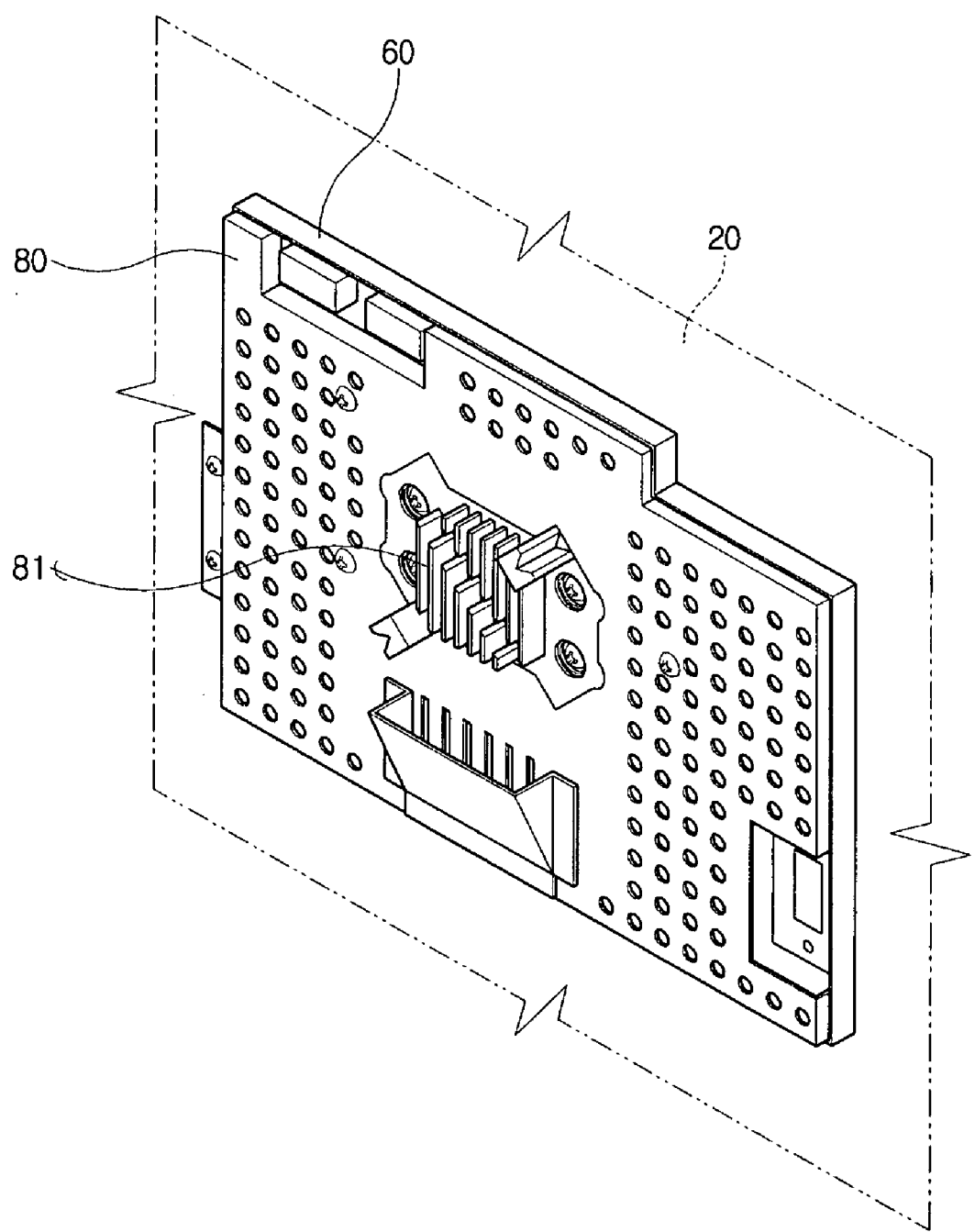
FIGS. 5A to 5C are perspective views illustrating a process of disassembling components.
Figure 5B:
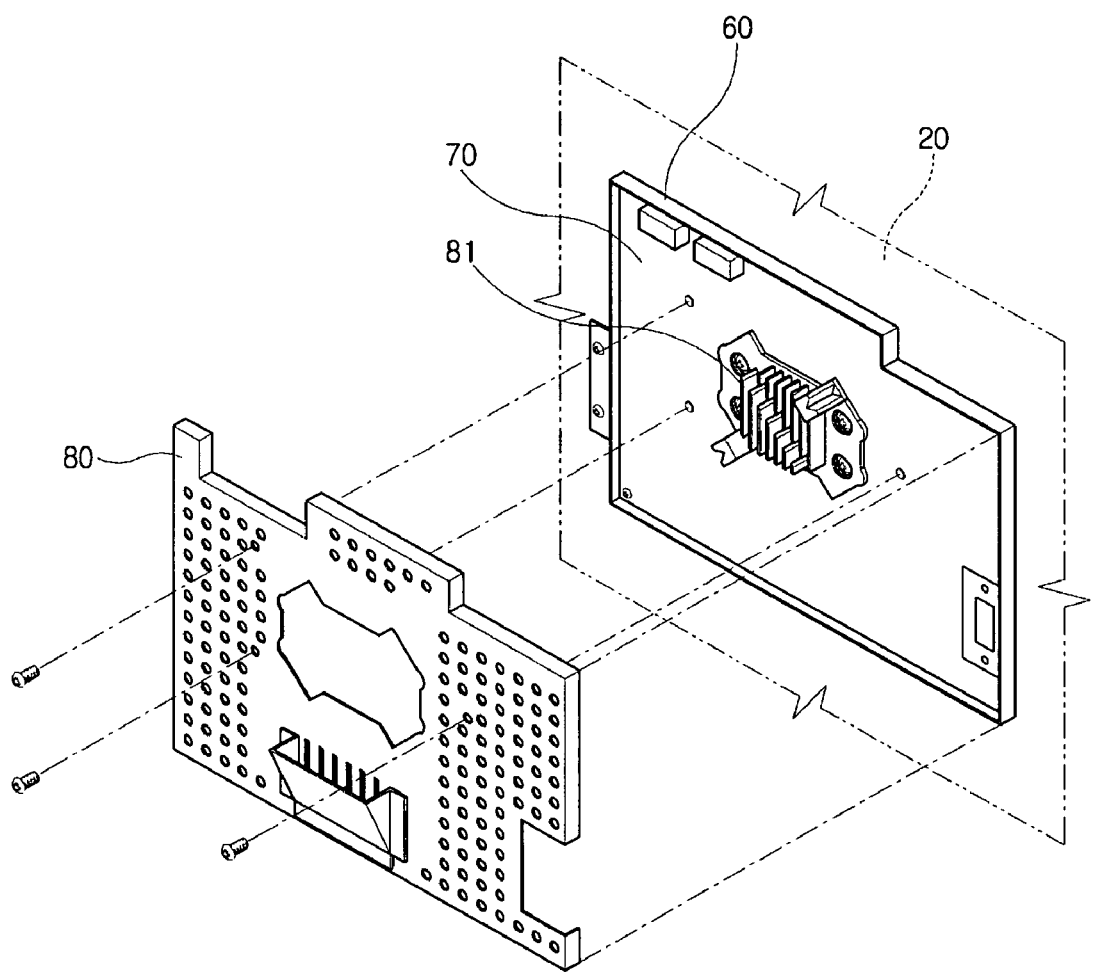
Figure 5C:
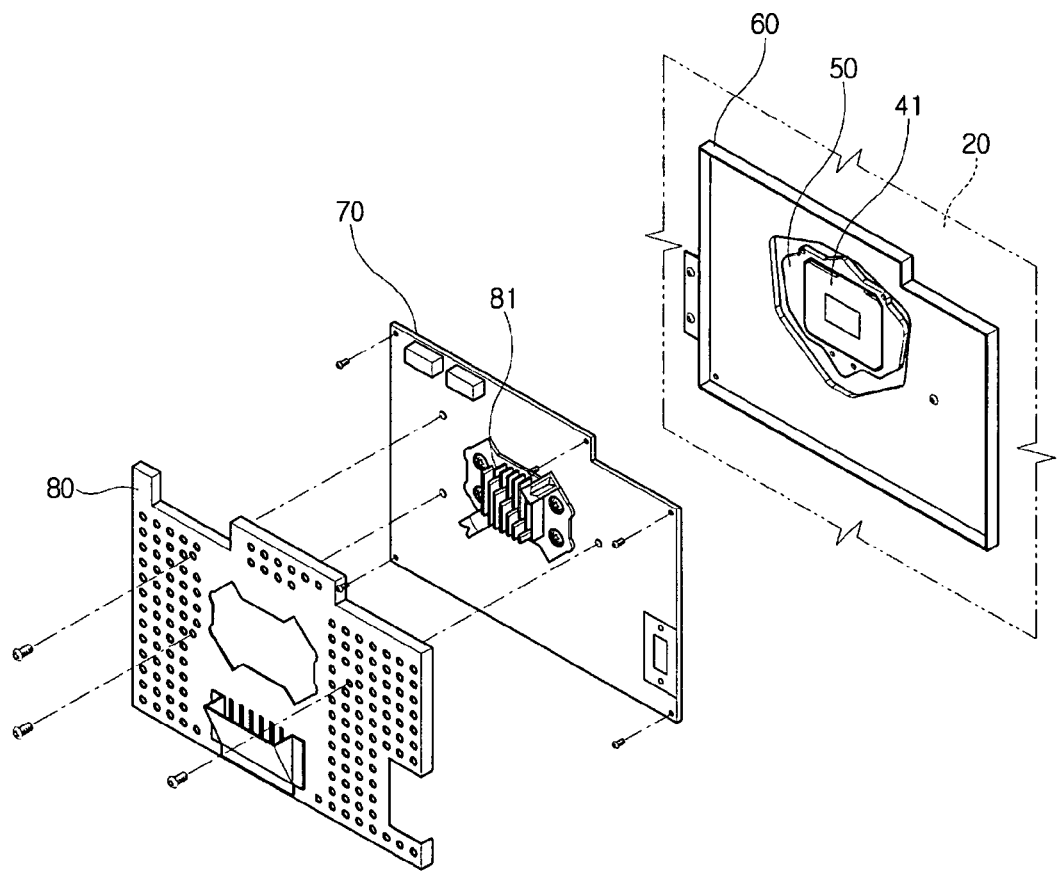

Referring to FIG. 5A, the element driving board 70 needs to be replaced or repaired in an assembled state of the optical engine apparatus 10. Referring to FIG. 5B, for repairing the element driving board 70, the rear shield 80 is disassembled from the element driving board 70. Then, referring to FIG. 5C, the element driving board 70 is disassembled from the front cover 60. Then the element driving board 70 can be replaced or repaired. The front cover 60 is not disassembled from the main body 20, and the element panel 50 coupled to the front cover 60 is not disassembled from the front cover 60. Accordingly, an image position or a focus of the display element 40 can be prevented from being changed, to prevent a decrease in quality.

Accordingly, the element driving board can be simply and stably replaced or repaired. Also, a work time for replacing or repairing the element driving board can be reduced.

As described above, a display apparatus and a manufacturing method thereof according to exemplary embodiments of the present invention allow a component to be replaced and repaired simply, rapidly and stably.

Also, a display apparatus and a manufacturing method thereof according to exemplary embodiments of the present invention prevent a decrease in quality from a replacing process and a repairing process, to thereby enhance reliability.

Although a few exemplary embodiments of the present invention have been shown and described, it will be appreciated by those skilled in the art that changes may be made in these embodiments without departing from the principles and spirit of the invention, the scope of which is defined in the appended claims and their legal equivalents.

What is claimed is:

1. A display apparatus comprising:
    a light source part which emits light;
    a main body which accommodates the light source part;
    a display element which displays an image using the light emitted from the light source part;
    an element panel which accommodates the display element;
    a front cover which is coupled to the main body and is provided with a panel mounting part to which the element panel is detachably coupled; and
    an element driving board which is coupled to the front cover, is opposite to the main body and is electrically connected with the display element, wherein the front cover is interposed between the element driving board and the main body,
    wherein the display element comprises a digital micromirror device (DMD),
    wherein the display element has a light incident side on which the light emitted from the light source part is incident and which faces a light incident direction,
    wherein the following elements are provided in the following order in the light incident direction: main body, front cover, and element driving board, and
    wherein the display element is coupled to the front cover using a coupling which is different than a coupling which couples the element driving board to the front cover so that the element driving board can be removed from the front cover without removing the display element from the front cover.

2. The display apparatus according to claim 1, further comprising an interposer which supports the display element, wherein the element panel comprises an element accommodating part which accommodates the interposer, and the element accommodating part is provided with a pushing protrusion which pushes the interposer.

3. The display apparatus according to claim 1, further comprising a rear shield which is coupled to the element driving board to shield the element driving board.

4. The display apparatus according to claim 2, further comprising a rear shield which is coupled to the element driving board to shield the element driving board.

5. The display apparatus according to claim 1, wherein the panel mounting part and the element panel are formed with a panel coupling hole, and the front cover and the element panel are coupled together by a screw which is inserted through the panel coupling hole.

6. The display apparatus according to claim 1, wherein the image displayed by the display element is magnified and projected onto a screen.

7. The display apparatus according to claim 6,
wherein the front cover has a first side which faces the light incident direction and a second side which is opposite the first side, and
wherein the element driving board is provided on the second side of the front cover.

8. The display apparatus according to claim 7, wherein the element driving board is removable from the front cover without removing the front cover from the main body.

9. A method of manufacturing a display apparatus comprising a main body which accommodates a light source part, comprising:
coupling a display element to an element panel;
detachably coupling the element panel to a panel mounting part of a front cover;
coupling the front cover to the main body when the front cover is coupled with the element panel; and
coupling to the front cover an element driving board which is electrically connected with the display element, is opposite to the main body, and interposes the front cover between the element driving board and the main body,
wherein the display element comprises a digital micromirror device (DMD),
wherein the display element has a light incident side on which light, which is emitted by the light source part which is accommodated in the main body, is incident and which faces a light incident direction,
wherein the following elements are provided in the following order in the light incident direction once the display apparatus is manufactured: main body, front cover, and element driving board, and
wherein the display element is coupled to the front cover using a coupling which is different than a coupling which couples the element driving board to the front cover so that the element driving board can be removed from the front cover without removing the display element from the front cover.

10. The method of manufacturing the display apparatus according to claim 9, further comprising:
accommodating the display element and an interposer which supports the display element to an element accommodating part which is formed to the element panel; and
pushing the interposer by a pushing protrusion which is formed to the element accommodating part.

11. The method of manufacturing the display apparatus according to claim 9, further comprising coupling a rear shield which shields the element driving board to the element driving board.

12. The method of manufacturing the display apparatus according to claim 10, further comprising coupling to the front cover an element driving board which is electrically connected with the display element, is opposite to the main body, and interposes the front cover between the element driving board and the main body.

13. The method of manufacturing the display apparatus according to claim 12, further comprising coupling a rear shield which shields the element driving board to the element driving board.

14. The method of manufacturing the display apparatus according to claim 9,
wherein the element driving device drives the display element,
wherein the front cover has a first side which faces the light incident direction and a second side which is opposite the first side, and
wherein the element driving board is coupled to the second side of the front cover.

15. The method of manufacturing the display apparatus according to claim 9,
wherein the display element forms an image using light which is emitted from the light source part which is accommodated in the main body, and
wherein the image formed by the display element is magnified and projected onto a screen.

16. A display apparatus comprising:
a main body in which a light source is provided;
a display element on which light emitted from the light source is incident and which forms an image using the light;
a front cover which is coupled to the main body and is detachably coupled to the display element; and
an element driving board which drives the display element, is coupled to the front cover, and is electrically connected with the display element,
wherein the image formed by the display element is magnified and projected onto a screen,
wherein the display element has a light incident side on which the light is incident and which faces a light incident direction,
wherein the front cover has a first side which faces the light incident direction and a second side which is opposite the first side,
wherein the element driving board is provided on the second side of the front cover,
wherein the display element comprises a digital micromirror device (DMD),
wherein the following elements are provided in the following order in the light incident direction: main body, front cover, and element driving board, and
wherein the display element is coupled to the front cover using a coupling which is different than a coupling which couples the element driving board to the front cover so that the element driving board can be removed from the front cover without removing the display element from the front cover.

* * * * *